April 17, 1951 — C. S. ASH — 2,549,155
BARN
Filed Aug. 2, 1945 — 2 Sheets-Sheet 1

INVENTOR.
Charles S. Ash.
BY
ATTORNEY

April 17, 1951 C. S. ASH 2,549,155
BARN

Filed Aug. 2, 1945 2 Sheets-Sheet 2

INVENTOR
Charles S. Ash.
BY Hobart ...
ATTORNEY

Patented Apr. 17, 1951

2,549,155

UNITED STATES PATENT OFFICE 2,549,155

BARN

Charles S. Ash, Milford, Mich.

Application August 2, 1945, Serial No. 608,485

5 Claims. (Cl. 119—15)

The present invention relates to building structures for the shelter and feeding of livestock.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate embodiments of the invention, and together with the description, serve to explain the principles of the invention.

It is an object of the present invention to provide a livestock barn in which the feed, such as hay, for the stock comprises the sheltering roof of the structure. Another object of the invention is to provide a slope to this roof so that the taller animals will feed at one section and the shorter animals will feed at other sections.

In general the invention comprises roofed structures with spaced rafter-like members extending from the top of said roofed structures downward to a supporting means, such as a beam, which is located between the roofed structures. The spaces between the rafters are preferably completely open and uncovered.

The structures of the present invention are especially useful in cold weather as the supply of feed acts as the protective roof of the structure. As the feed, and hay shall be taken for an example, is thrown on the rafters it will accrete from the lower portions of the rafters up to the higher portions, the lower hay acting as a support for that resting upon it. In this way, the hay will ultimately cover the entire open space between the rafters. The hay, of course, will hang down between the rafters and become accessible to the animals in the structure. The taller animals, such as cattle or horses, will feed upon the hay which is hanging from the higher portions of the rafters, while shorter animals, such as sheep, will feed upon that hanging from the lower portions. As they feed and exhaust the bottom portion of the hay, more will come within their reach through the combined effect of the friction of the hay upon itself, and gravity. When the point is reached where the hay ceases to become accessible at particular points the animals will move on and the same procedure will follow at other points.

Figure 1:
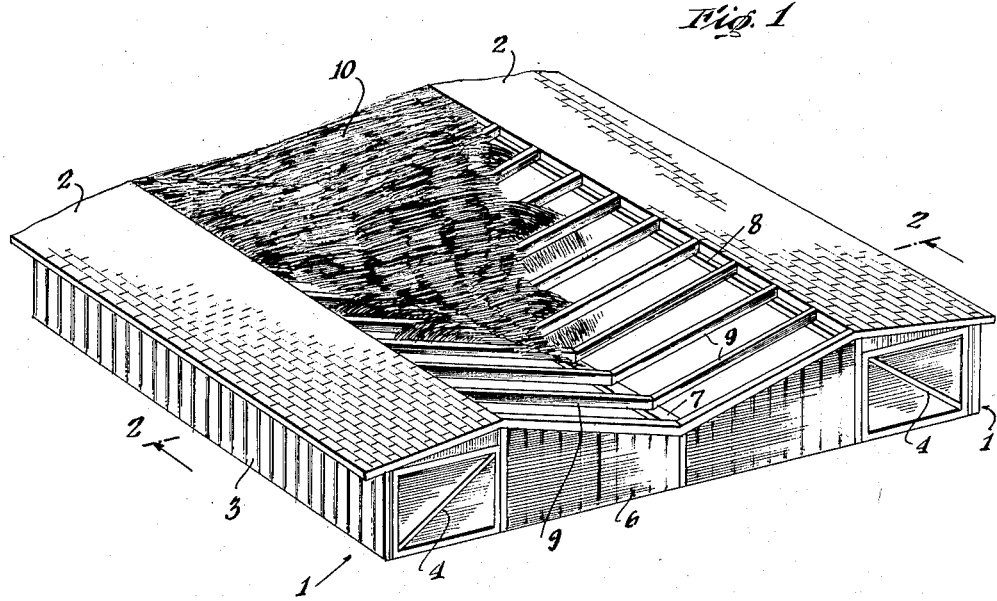
Fig. 1 is a perspective view of the top, an end, and a side of a structure embodying the present invention.
Figure 2:
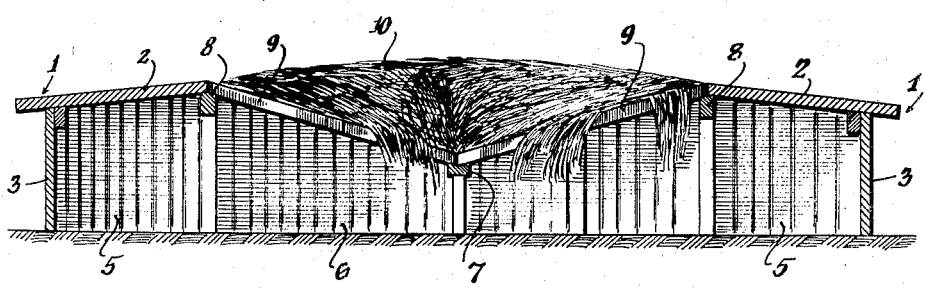
Fig. 2 is a sectional view taken along line 2—2 of Fig. 1.

Referring now in detail to the illustrative embodiments of the present invention, as shown by way of example in Figs. 1 and 2 of the accompany drawings, this embodiment of the invention comprises substantially parallel spaced sheds 1 each having a roof 2, a side wall 3, and a door 4, at one end, and an end wall 5 at the other end. The sheds 1 are connected to each other at each of their ends by walls 6. A beam 7 extends from approximately the center of one wall 6 to the other wall 6. Said beam 7 is located in a plane substantially lower than that of the inner portion of the shed roof 2. Along and below the inner edge of each shed roof 2 extends a beam 8. A series of substantially parallel, spaced rafter-like members 9 extend from the roof beams 8 to the center beam 7. These rafter-like members 9 are separated from each other laterally by substantially regular spaces, so that the feed 10 may be evenly distributed.

The opening for each door 4 is of sufficient size for a vehicle, such as a truck or wagon, to be driven into the passageway under the roof 2. Each roof 2 and side wall 3, is of dimensions sufficient to permit the passage of said vehicle completely along the passageway for the purpose of removing refuse from the structure.

The rafters 9 at their lower ends near the beam 7 are raised from the floor approximately the height of a sheep. At their higher ends, near the beams 8, they are raised from the floor approximately the height of a horse. Said rafters 9 are sufficiently long to accommodate several animals lengthwise beneath them.

Figure 3:
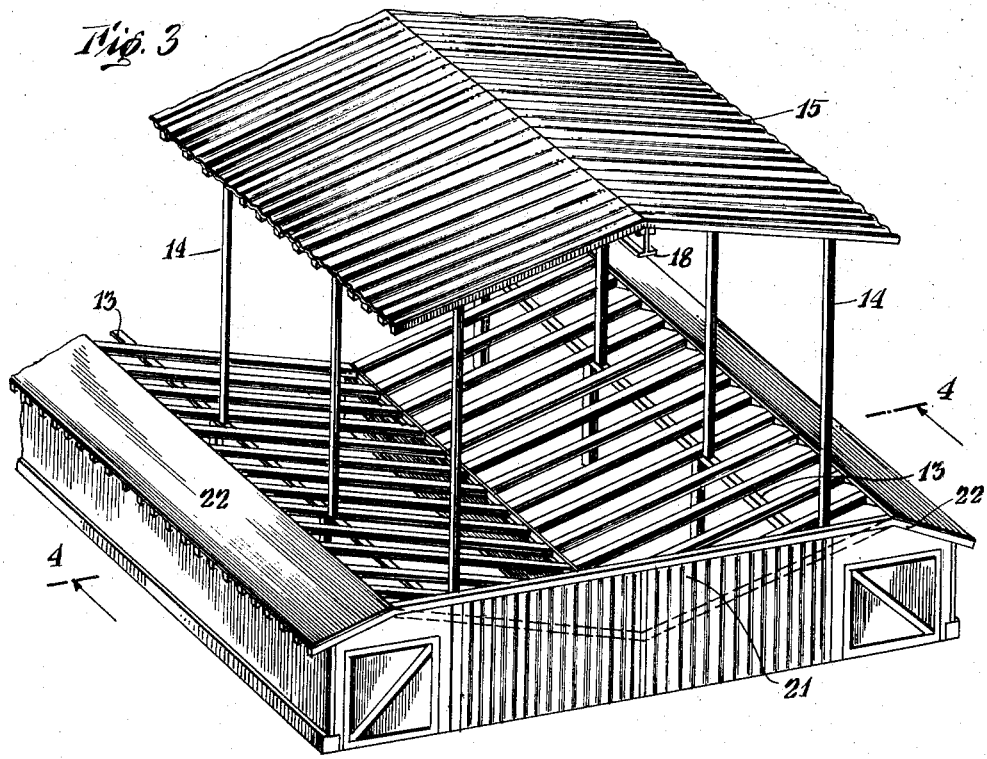
Fig. 3 is a perspective view of the top, an end, and a side of a structure embodying a modification of the present invention.
Figure 4:
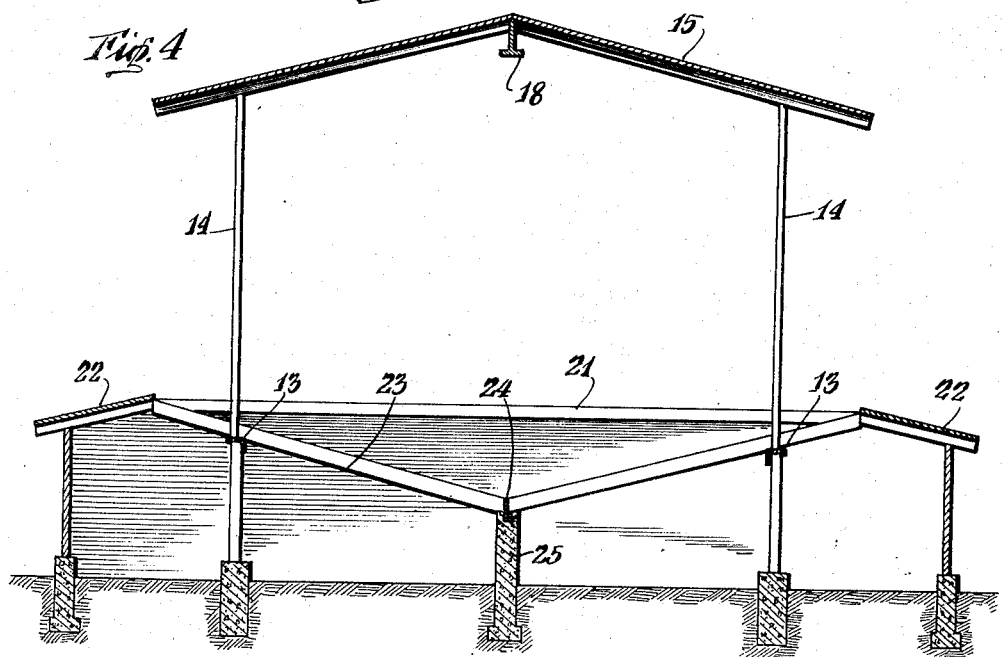
Fig. 4 is a sectional view taken along line 4—4 of Fig. 3.

When the rafters 9 are loaded with straw, crushed fodder, and the like, such feed can be blown into place after coming through the machine. However, if it is intended to load the rafters 9 with hay which is hauled directly from the field this may best be done by means of a power operated fork or sling. For such purposes, the modification shown in Figs. 3 and 4 is used.

A steel super-structure is built on top of a building structure substantially as shown in Figs. 1 and 2, and previously described.

Extending upward from beams 13 are a plurality of uprights 14, which support a roof 15. Attached to the under side of the roof 15 and extending longitudinally thereof in approximately the mid-line is a mono-rail 18 along which a power driven hay fork or sling, not shown, may be driven.

As in the previous embodiment just described, a plurality of inclined rafters 23 are provided, and these are supported at the lower ends on longitudinally extending beams 24 supported by posts 25.

The entire super-structure is preferably composed of structural steel and finished off with corrugated steel roofing.

In the modification shown in Figs. 3 and 4 of the drawings it will be noticed that the end walls 21 are closed flush with the shed roofs 22. This prevents the animals from feeding from the outside of the structure off the ends.

The feed may be placed in the structure during the seasonable harvest time. The shed will not be occupied and the feed will not be used ordinarily until winter.

The invention in its broader aspects is not limited to the specific mechanisms shown and described but departures may be made therefrom within the scope of the accompanying claims without departing from the principles of the invention and without sacrificing its chief advantages.

What I claim is:

1. A farm building comprising, in combination, a pair of laterally separated, longitudinally extending substantially parallel roofed structures, a plurality of rafter-like members extending from the edge of the roof of each of said structures nearer the other said structure to substantially a central position between said structures, means for supporting the ends of said members between said structures upon the ground, said members from each said structure being substantially parallel to each other and downwardly inclined from said roof edges to their ends centrally between said structures forming a V shaped trough to receive animal feed forming a roof supported by said members, said structures being substantially entirely open at their sides facing each other, said structures being high enough to at least accommodate a horse and said ends of said members between said structures being supported above the ground to about the height of a sheep, said members being of sufficient length to accommodate several animals lengthwise thereof.

2. A farm building as set forth in claim 1 wherein walls are provided between respective ends of said roofed structures said walls serving to close off the space between said roofed structures.

3. A farm building as set forth in claim 1 wherein side walls are provided on three sides of each of said roofed structures and walls are provided between respective ends of said roofed structures said latter walls serving to close off the space between said roofed structures.

4. A farm building as set forth in claim 1 wherein walls are provided between respective ends of said roofed structures said walls being throughout substantially the height of the highest point of said roofed structures.

5. A farm building as set forth in claim 1 wherein a roof portion is provided substantially entirely covering the space between said roofed structures wherein said rafter-like members are positioned for the holding of animal feed.

CHARLES S. ASH.

REFERENCES CITED

The following references are of record in the file of this patent:

UNITED STATES PATENTS

| Number | Name | Date |
|---|---|---|
| 247,917 | Irwin | Oct. 4, 1881 |
| 449,303 | Warren | Mar. 31, 1891 |
| 706,610 | Stipp | Aug. 12, 1902 |
| 730,275 | Laswell | June 9, 1903 |
| 884,334 | Jackson | Apr. 7, 1908 |
| 1,155,189 | Adams | Sept. 28, 1915 |
| 1,184,147 | Talcott | May 23, 1916 |
| 1,518,664 | Maryott | Dec. 9, 1924 |
| 1,532,276 | Swarta | Apr. 7, 1925 |
| 1,740,510 | Heine | Dec. 24, 1929 |
| 1,768,861 | Richards | July 1, 1930 |

FOREIGN PATENTS

| Number | Country | Date |
|---|---|---|
| 44,668 | Denmark | Sept. 23, 1931 |